3,391,185
3-AMINO-2,5,6-TRICHLOROBENZOIC ACID
Max T. Goebel, Chadds Ford, Pa., assignor to E. I. du Pont de Nemours and Company, Wilmington, Del., a corporation of Delaware
No Drawing. Continuation-in-part of application Ser. No. 610,633, Sept. 18, 1956. This application July 17, 1959, Ser. No. 827,711
1 Claim. (Cl. 260—518)

This application is a continuation-in-part of application Ser. No. 610,633, filed Sept. 18, 1956, and now abandoned.

This invention relates to novel aminochlorobenzoic acids, to their use as herbicides, to their use as intermediates for the preparation of polychlorobenzoic acid and to their use in herbicidal mixtures with other herbicides. The invention also relates to novel herbicidal compositions and methods employing such aminochlorobenzoic acids either as the sole active ingredient or in synergistic admixture with herbicidal aryl aliphatic urea compounds or herbicidal polychlorobenzoic acid compounds.

More particularly this invention is directed to compounds represented by the formula:

(1) 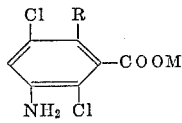

where R is selected from the group consisting of hydrogen and chlorine, and M is selected from the group consisting of hydrogen, alkali metal, ammonium, methylammonium, dimethylammonium, trimethylammonium, and ethylenediammonium, and to the herbicidal compositions and methods employing these compounds.

Note that Formula 1 covers essentially two compounds, 2,5-dichloro-3-aminobenzoic acid and 2,3,6-trichloro-5-aminobenzoic acid, and their respective salts. By the term "alkali metal" reference is had to those metals in the Periodic Table which are classified as alkali metals, to wit, sodium, potassium and other metals of Group 1A.

These compounds have surprising safety to economic crops when applied pre-emergence to crops for the control of germinating weeds. They also have utilities for the control of young emerged broad leaves and grasses when applied as a directed post-emergence spray. Further, they can be used for the control of established broad leaf weeds growing in economic grass crops, such as sugar cane, corn, sorghum, broom corn, and the like.

The compounds of Formula 1 can be advantageously used together with certain other herbicides such as the polychlorobenzoic acid compounds and the arylaliphatic urea compounds to produce mixtures which are economically more effective for the control of weeds than are the herbicidal components of the mixtures when employed separately.

The compounds of Formula 1 are also useful as intermediates for the synthesis of the corresponding polychlorobenzoic acids, to wit, 2,3,5,6-tetrachlorobenzoic acid and 2,3,5-trichlorobenzoic acid.

When the compounds of Formula 1 are used as herbicides, they are especially useful for the pre-emergence control of grass and broad leaves in agricultural and horticultural crops. Examples of the former include corn, sorghum, soy beans, field and dry beans, safflower, and flax. Examples of the latter include lima beans, black valentine beans, carrots, and peas.

In general, the compounds of Formula 1 are applied at rates of from about 1.5 to 8 pounds per acre or, as a preferred rate, from about 3 to 5 pounds per acre.

When the compounds of Formula 1 are used as herbicides in admixture with polychlorobenzoic acid compounds or arylaliphatic urea compounds the results obtained frequently demonstrate synergistic activities, since greater kill of weeds is obtained by using the mixtures than is obtained by using the components separately at equivalent rates.

Any of the well-known herbicidally active arylaliphatic urea compounds such as those disclosed in Todd Patent Nos. 2,655,444–7 can be used in mixtures with the compounds of the invention. Thus the herbicidally active arylaliphatic ureas of my compositions are those represented by the formula:

(2) 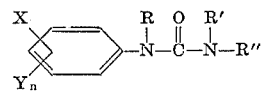

wherein X is from the group consisting of hydrogen and halogen, Y is from the group consisting of hydrogen, halogen, and alkyl containing less than 5 carbon atoms, $n$ is a positive whole number less than 3, R is selected from hydrogen and methyl, R' is selected from hydrogen and alkyl containing less than 5 carbon atoms and R" is selected from the group consisting of methyl and ethyl.

Illustrative of the arylaliphatic urea herbicidal compounds of Formula 2 are:

1-phenyl-3-methylurea
1-p-chlorophenyl-3,3-dimethylurea
1-p-bromophenyl-3,3-diethylurea
1-phenyl-3,3-dimethylurea
1-(3-chloro-p-tolyl)-3,3-dimethylurea
1-(2,4-dimethylphenyl)-3,3-dimethylurea
1-m-tolyl-3,3-dimethylurea
1-p-ethylphenyl-3,3-dimethylurea
1-p-tolyl-3,3-dimethylurea
1-p-sec.butylphenyl-3,3-dimethylurea
1-phenyl-3,3-dimethylurea
1-p-chlorophenyl-3,3-dimethylurea
1-m-tolyl-3,3-dimethylurea
1-m-chlorophenyl-3,3-dimethylurea
1-p-bromophenyl-3,3-dimethylurea
1-m-bromophenyl-3,3-dimethylurea
1-m-fluorophenyl-3,3-dimethylurea
1-p-iodophenyl-3,3-dimethylurea
1-(3,4-dichlorophenyl)-3,3-dimethylurea
1-(3,4-dichlorophenyl)-3,3-diethylurea
1-(3,4,5-trichlorophenyl)-3,3-dimethylurea
1-(3,4,5-trichlorophenyl)-3,3-diethylurea
1-(3,4-xylyl)-3,3-dimethylurea
1-(3,4-xylyl)-3,3-diethylurea
1-(3-chloro-p-tolyl)-3,3-dimethylurea
1-(3-chloro-p-tolyl)-3,3-diethylurea
1-(3,5-dichloro-p-tolyl)-3,3-dimethylurea
1-(3,5-dichloro-p-tolyl)-3,3-diethylurea
1-(p-chlorophenyl)-1,3,3-trimethylurea
1-(3,4-dichlorophenyl)-1,3,3-trimethylurea
1-(3,4-dichlorophenyl)-3-butyl-3-methylurea The best aryl aliphatic ureas for use in my compositions and methods are 1-(p-chlorophenyl)-3,3-dimethylurea; 1-penyl-3,3 - dimethylurea; 1-(3,4-dichlorophenyl)-3,3-dimethylurea; 3-(3,4-dichlorophenyl) - 1,1,3-trimethylurea and 1-(3,4-dichlorophenyl)-3-butyl-3-methylurea.

Similarly any of the well-known herbicidally active polychlorobenzoic acid compounds can be used in mixtures with the compounds of this invention. Thus, the herbicidally active polychlorobenzoic acids compounds of these mixtures are those represented by the formula:

(3) 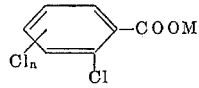

where: M is selected from the group consisting of hydrogen, an alkali metal ion, ammonium ion, methylammonium ion, dimethylammonium ion, trimethylammonium ion, and ethylenediammonium ion, and $n$ is an integer selected from the group consisting of 2 and 3.

Preferred polychlorobenzoic acids or salts are those which are hindered in the 2-position since there appears to be a definite direct relationship between 2-position hindrance and herbicidal activity. Thus, preferred compositions use those compounds from the class consisting of 2,3,5-trichlorobenzoic acid, 2,3,6-trichlorobenzoic acid, 2,3,4,6-tetrachlorobenzoic acid, 2,3,5,6-tetrachlorobenzoic acid and their salts as noted above.

By the term "alkali metal" is meant a metal from Group IA of the Periodic Table. Either ½ mole or 1 mole of ethylene diamine can be used for each mole of polychlorobenzoic acid.

Of course, the salts of the herbicidally active acids used in this invention can be used in the preferred compositions. For example, 2,3,6-trichloro-5-aminobenzoic acid, and its salts such as alkali metal, ammonium or substituted ammonium salts can be used.

When the compounds of Formula 1 are used as intermediates for the production of polychlorobenzoic acid such conversion can be carried out easily by dissolving a compound of Formula 1 in concentrated hydrochloric acid, diazotizing by adding to the solution sodium nitrite and then adding the resulting solution slowly to a solution of cuprous chloride in concentrated hydrochloric acid. Upon cooling of the resulting mixture, substantially pure polychlorobenzoic acid compound precipitates (i.e., either 2,3,5,6-tetrachlorobenzoic acid or 2,3,5-trichlorobenzoic acid, depending on which starting material of Formula 1 is used).

When compounds of Formula 1 are used as herbicides either by themselves or in admixture with other herbicides they will be formulated with conventional pest control adjuvants or modifiers to provide compositions in the form of solutions, dusts, water-dispersible powders, aqueous dispersions or emulsions, granules, and pellets. Thus, they can be formulated with a carrier such as a finely divided solid, a solvent liquid of organic origin, water, a wetting agent, a dispersing agent, and an emulsifying agent, an aqueous emulsion or any suitable combination of any of these.

Pest control adjuvants or conditioning agents such as dusts, solvents, wetting agents, dispersing agents and emulsifying agents set out in U.S. Patent 2,426,417 can be employed in the preparation of the herbicidal compositions of this invention. Other wetting, dispersing and emulsifying agents such as those listed in detail in Bulletin E 607 of the Bureau of Entomology and Plant Quarantine of the U.S. Department of Agriculture, and such as those set out in an article by McCutcheon in Soap and Chemical Specialties, July, August and September, 1955, entitled "Synthetic Detergents and Emulsifiers" can also be used.

Thus, the compositions can be applied as aqueous foliar sprays, and can also be applied as sprays directly to the surface of the soil. Granules and pellets can be applied post-emergence to the crops and pre-emergence to the weeds. Alternatively, the dry powdered compositions can be dusted directly on the plants or on the soil.

The active ingredients are, of course, applied in amount sufficient to exert the desired herbicidal action. The amount of herbicidally active compounds present in the compositions as actually applied for destroying or preventing weeds will vary widely with the herbicidal activity of the active ingredients, the purpose for which the application is being made (i.e., whether for short term or long term control), the manner of application, the particular weeds for which control is sought, and like variables.

Thus, when these active ingredients are used for control of weed infestations that plague food crops, the compositions containing the active ingredients are normally further diluted with a liquid to form a spray composition or with a powdered solid to give a granule, pellet or dust containing relatively low concentration of the active compounds.

Compositions containing these ingredients may be used to sterilize soil as in the treatment of power line or railroad right-of-ways, by application at somewhat higher rates than those used for weed control in economic crops.

In the preparation of sprays the active herbicidal compounds can be dispersed separately in water or other liquid carriers and then mixed together. Alternatively, the herbicidal compounds can be mixed one with the other and the resulting mixture dispersed in the liquid carrier.

Still another method of preparing these compositions is to mix the herbicidal compounds with a finely divided carrier or dust, such as talc, pyrophyllite, natural clays, diatomaceous earth or other power diluent, preferably of less than about 50 microns in average particle diameter, such as those set out in the aforementioned U.S. patent. The resulting mixture can be dispersed in water. Any compatible wetting or dispersing agent can be employed in the mixture either before or after mixture of the active ingredients with the liquid to obtain spray compositions.

Granular or pellet compositions of the invention are obtained by spraying an aqueous suspension of the active agents onto a carrier such as attapulgite, vermiculite, or bentonite clays. Agitation of the resulting paste in a ribbon blender followed by drying produces granules whereas extrusion of the paste in a conventional pelleting machine followed by drying produces pellets.

Dust compositions of the invention are obtained by mixing the active herbicidal compounds or mixed salts with finely divided solids such as talc, pyrophyllite, natural clays, diatomaceous earth, and other powder diluents such as aforementioned to give homogeneous, free-flowing dusts or powders. The amount of the herbicidal compounds included in such dusts will vary with the manner in which the composition is to be applied, but in general the dust will contain from about 0.1% to 95% by weight of herbicidally active compounds.

Liquid compositions of the invention contain active components either homogeneously dispersed in water or non-solvent carriers, or dissolved in water or a solvent. To secure homogeneous dispersions in non-solvent liquid adjuvants, a surface-active agent of the wetting, dispersing or emulsifying type is used. In fact, it is preferred that the herbicidal compositions of the invention whether in liquid or in solid form contain the herbicidally active compounds or mixed salt homogeneously admixed with such a surface-active agent.

Generally, the wetting, dispersing, or emulsifying agent will not comprise more than about 5–15% by weight of the composition, and with the better surface-active adjuvant materials, the percentage ordinarily will be 5% or less. Usually, the minimum lower concentration will be 0.1%.

The herbicidal compositions are applied either as a spray, dust, granules, or pellets to the locus or area to be protected from weeds. Such application can be made directly upon the locus or area and the weeds thereon during the period of weed infestation in order to destroy the weeds, or alternatively, the application can be made in advance of an anticipated weed infestation to prevent such infestation.

As those skilled in the art will appreciate herbicidal mixtures employing compounds of Formula 1 can vary extremely in the amounts of herbicidally active ingredients that they contain. For example, to obtain control of weeds in tomatoes one can apply a mixture of about 2 pounds of Neburon 1-(3,4-dichlorophenyl-3-butyl-3-methylurea) with 2 pounds of 2,5-dichloro-3-aminobenzoic acid. To control weeds in black valentine beans one can apply 2 pounds of Neburon with 1.5 pounds of 2,3,6-trichloro-5-aminobenzoic acid. For weed control in soy beans one can apply about 2 pounds of Neburon with 1.5 pounds of 2,3,6-trichloro-5-aminobenzoic acid. Weed control in carrots is obtained by applying about 2 pounds of Neburon with 2 pounds of 2,5-dichloro-3-aminobenzoic acid. To control weeds in safflower one can apply about 1 pound of diuron (1-(3,4-dichlorophenyl)-3,3-dimethylurea) with 3 pounds of 2,5-dichloro-3-aminobenzoic acid. Application of such mixtures when applied pre-emergence at the beginning of a growing season usually give extended control of weeds.

When the aminochlorobenzoic acid compounds of Formula 1 are mixed with herbicidal arylaliphatic urea compounds the ratio of aminochlorobenzoic acid compounds to arylaliphatic urea compounds will usually range from about 1:4 to 4:1.

Compounds of Formula 1 are easily prepared by nitrating the appropriate polychlorobenzoic acid starting material in an aqueous sulfuric-nitric acid mixture to produce the nitrated polychlorobenzoic acid (the nitro group being in a meta position with respect to the carboxyl group). This compound is then reduced with hydrochloric acid in the presence of iron to give the aminochlorobenzoic acid. Salts are then conventionally prepared by addition of the appropriate salt solution using the appropriate anion.

The whole operation of producing a polychlorinated benzoic acid from the appropriate starting material using a compound of Formula 1 as an intermediate can be illustrated by the following example. For example, the acid itself can be prepared by nitrating 2,3,6-trichlorobenzoic acid in an aqueous sulfuric-nitric acid mixture to produce 2,3,6-trichloro-5-nitrobenzoic acid, which precipitates and can be separated easily. This compound is then reduced with hydrochloric acid in the presence of iron to give 2,3,6-trichloro-5-aminobenzoic acid. This compound is then dissolved in concentrated hydrochloric acid and diazotized by adding to the solution sodium nitrite and then adding the solution slowly to a solution of cuprous chloride in concentrated hydrochloric acid. Upon cooling of the mixture substantially pure 2,3,5,6-tetrachlorobenzoic acid precipitates.

The invention and its various uses is further illustrated by reference to the following examples.

EXAMPLE 1.—PREPARATION OF 2,3,6-TRICHLORO-5-AMINOBENZOIC ACID

A mixture consisting of 350 parts of 2,3,6-trichlorobenzoic acid in 2776 parts of concentrated sulfuric acid was stirred vigorously while being treated over a 45 minute period with 780 parts of a mixture containing equal amounts of concentrated nitric and concentrated sulfuric acids. The temperature of the reaction mixture was maintained at 40–45° C. during the addition and for 1¾ hours after the addition was completed. The mixture was then continuously poured, with stirring, into about 7000 parts of ice and water. The resulting solid 5-nitro-2,3,6-trichlorobenzoic acid was filtered, washed well with water and allowed to air-dry. After recrystallization from a benzene-hexane mixture, 302 parts of pure nitro compound melting at 163–164° C. was obtained.

The 5-nitro-2,3,6-trichlorobenzoic acid prepared above was added portion wise and with stirring over a 45 minute period to a refluxing mixture of 1800 parts of alcohol, 234 parts of iron powder, and 36 parts of concentrated hydrochloric acid. Reflux was continued for 4 hours, at the end of which time the mixture was made alkaline with 20% aqueous sodium hydroxide and filtered hot. The filtrate was made acidic with concentrated hydrochloric acid and diluted with water whereupon a solid precipitated. The solid was collected, pressed nearly dry and recrystallized from an ethanol-water mixture. In this manner 135 parts of pure 5-amino-2,3,6-trichlorobenzoic acid, melting at 245–246° C. was obtained.

EXAMPLE 2.—PREPARATION OF 3-AMINO-2,5-DICHLOROBENZOIC ACID

A mixture consisting of 23.6 parts of 3-nitro-2,5-dichlorobenzoic acid (prepared according to the method described by Hodgson and Bean, J. Chem. Soc. 1927, 2381), 23 parts of iron powder, and 200 parts of ethanol was heated to reflux and held at reflux while 100 parts of 6 N hydrochloric acid was added over a 2 hour period. After an additional hour at reflux the mixture was poured into 800 parts of 0.1 N aqueous sodium hydroxide and filtered hot. To the clear, colorless filtrate was added 17 parts of concentrated hydrochloric acid. The resulting white solid was filtered, washed well with water and dried to give 12.5 parts of 3-amino-2,5-dichlorobenzoic acid, melting at 185–195° C.

These compounds can be converted to salts by simply contacting an aqueous suspension of the acid with an aqueous solution of an equimolar amount of the desired base followed by evaporation of the water. If desired the aqueous solution of the salt can be used directly. The amine salts can also be prepared by reaction of a solution of the acid in a nonpolar solvent such as benzene with the desired amine whereupon the salt separates as a solid and can be collected by filtration.

FORMULATION AND USE EXAMPLES

Example 3

| | Percent |
|---|---|
| 5-amino-2,3,6-trichlorobenzoic acid, Na salt | 30 |
| Alkyd naphthalene sulfonic acid, Na salt | 1.5 |
| Sodium lignin sulfonate | 1.0 |
| China clay | 67.5 |

This composition is dispersed in water to form a sprayable composition containing 1% by weight of active material.

When sprayed at a rate of 4 pounds per acre excellent control of lambs-quarters, pigweed, crabgrass, and water grass is obtained in a field of safflower.

This formulation given effective pre-emergence control of velvet leaf, annual bluegrass, and crabgrass in sorghum seed at 4 pounds per acre.

| | Percent |
|---|---|
| 5-amino-2,3,6-trichlorobenzoic acid | 25 |
| Anhydrous sodium sulfate | 5 |
| Kaolin clay | 70 |

The above composition is prepared by mixing the listed ingredients with water to form a paste. The paste is then extruded, dried, and ground to give the desired granular size, in order of ½₂ to ¹⁄₁₆" diameter.

When this composition is applied as above similar results are obtained.

Example 4

| | Percent |
|---|---|
| 3 - amino - 2,5 - dichlorobenzoic acid, dimethylamine salt | 6 |
| Water | 94 |

This solution is sprayed pre-emergence at a rate of 5 pounds per acre of active material in 40 gallons water to a newly planted field of soybeans. Excellent control of mustard, velvet leaf, pigweed, crabgrass and giant foxtail is obtained.

Example 5

| | Percent |
|---|---|
| 3-amino-2,5-dichlorobenzoic acid | 50 |
| Sodium lignin sulfonate | 5 |
| Kaolin clay | 45 |

The above composition is prepared by mixing the heated ingredients with water to form a paste. The paste is extruded, dried, and ground to give the desired granular size, in order of ½₂ to ¹⁄₁₆" diameter. These granules are applied as above.

Example 6

The following wettable powder composition is applied at the rate of 2.5 pounds per acre to a garden area after planting corn.

| | Percent |
|---|---|
| 3-(p-chlorophenyl)-1,1-dimethylurea | 25.00 |
| 2,3,5,6-tetrachlorobenzoic acid, sodium salt | 25.00 |
| 2,3,6-trichloro-5-aminobenzoic acid, sodium salt | 25.00 |
| Sodium lignin sulfonate | 0.50 |
| Alkylnapthalene sulfonic acid, sodium salt | 0.75 |
| Attapulgite clay | 23.75 |

It is found that this treatment gives excellent pre-emergence control of weed infestation of the garden area without substantial damage to the crop.

The claim is:
1. 3-amino-2,5,6-trichlorobenzoic acid.

References Cited

UNITED STATES PATENTS 3,014,063  12/1961  McLane et al. _____ 260—518 X

OTHER REFERENCES

Beilstein, "Handbuch der Organische Chemie," vol. XIV, p. 418 (1931).

Sadler et al., "Jour. Am. Chem. Soc.," vol. 78, pp. 1251–5 (1956).

Thompson et al., "Botanical Gaz.," vol. 107, pp. 489, 490, 496 (1946).

Wittle et al., "Jour. Am. Chem. Soc.," vol. 69, pp. 1789–92 (1947).

Zimmerman et al., "Contrib. Boyce Thompson Inst.," vol. 16, p. 423 (1952).

LORRAINE A. WEINBERGER, *Primary Examiner.*

L. ZITVER, *Examiner.*

L. A. THAXTON, *Assistant Examiner.*